United States Patent [19]

Latiri

[11] Patent Number: 5,721,399
[45] Date of Patent: Feb. 24, 1998

[54] GOLF CLUB SWING WEIGHT SCALE

[76] Inventor: Mondher Latiri, 7F 95-5 Shin-Gia Road, Feng-Shan, Kaohsiung, Taiwan

[21] Appl. No.: 659,925

[22] Filed: Jun. 7, 1996

[51] Int. Cl.$^6$ .................. G01G 1/00; G01G 3/08; G01G 1/18; A63B 53/00
[52] U.S. Cl. .................. 177/201; 177/229; 177/246; 177/208; 73/65.03
[58] Field of Search ................ 73/65.03; 177/157, 177/158, 201, 203, 204, 199, 200, 208, 229, 246, 253, 254

[56] References Cited

U.S. PATENT DOCUMENTS

| | | | |
|---|---|---|---|
| 1,897,027 | 2/1933 | Gumprich | 73/65.03 |
| 2,108,877 | 2/1938 | Wettlaufer | 73/65.03 |
| 2,595,717 | 5/1952 | Smith | 73/65.03 |
| 3,577,771 | 5/1971 | Solheim | 73/65.03 |
| 4,043,184 | 8/1977 | Sayers | 73/65.03 |
| 4,212,193 | 7/1980 | Turley | 73/65.03 |
| 4,632,198 | 12/1986 | Uchimura | 177/229 |
| 4,726,435 | 2/1988 | Kitagawa et al. | 177/229 |
| 4,747,314 | 5/1988 | Huang | 73/65.03 |
| 5,222,398 | 6/1993 | O'Brien | 177/211 |
| 5,367,129 | 11/1994 | Lahl, Jr. | 177/229 |
| 5,646,375 | 7/1997 | Neuman | 177/229 |

FOREIGN PATENT DOCUMENTS

| | | |
|---|---|---|
| 381729 | 10/1932 | United Kingdom . |
| 557192 | 11/1943 | United Kingdom . |
| 1220804 | 1/1971 | United Kingdom . |

Primary Examiner—Michael L. Gellner
Assistant Examiner—Randy W. Gibson
Attorney, Agent, or Firm—Richard C. Litman

[57] ABSTRACT

A golf club swing weight scale includes dual weighing scales arranged to provide for the simultaneous measurement of both the total weight and the swing weight of a golf club or other object. The device may include weight scales using either electronic load cells or strain gauges, hydraulic or pneumatic pressure measurement, or mechanical operation, as desired. The scale also includes a weighing pan providing for the weighing of various separate components, as well as providing for the retention of a golf club thereon to determine the total and swing weight thereof. The device also includes stops to preclude excessive oscillation of the weighing pan and club retainers, as well as a golf club or other article placed thereon, during the weighing operation, thus reducing the time required for the scale to come to a rest position. Thus, the present swing weight scale provides for the rapid and accurate determination of both the total weight and the swing weight, or moment from a predetermined position, of a golf club, thereby enabling a technician to make adjustments to the total weight and swing weight of each club of a set as required to match a set of golf clubs accurately.

20 Claims, 4 Drawing Sheets

GOLF CLUB SWING WEIGHT SCALE

BACKGROUND OF THE INVENTION

1. Field of the Invention

The present invention relates generally to devices for measuring the weights of objects, and more particularly to a scale providing for the simultaneous measurement of the total weight and swing weight, or weight along a predetermined arm or distance from the center of gravity. The scale provides numerous advantages over earlier such devices, such as the simultaneous weighing of two weights at different points, substantially reduced oscillation of the scale balance and improved damping, and excellent sensitivity. The present scale may be used for the measurement of the weight and/or moment of innumerable objects, but is particularly adapted to measure the total weight and weight along an arm of predetermined length (swing weight) of a golf club.

2. Description of the Prior Art

The game of golf is extremely popular throughout the entire world, and both the serious amateur and the professional golfer seek every refinement and advantage possible. Obviously, a set of golf clubs includes numerous attributes which may be adjusted, such as club shaft length and flex, club face angle and weight, grip, and mass distribution throughout the club and shaft, or swing weight.

The swing weight of a club is generally defined as the moment (in inch-ounces) required to balance a golf club at a point either fourteen or twelve inches (depending upon the system used) from the upper end of the grip. It will be seen that two different clubs of equal weight, with the first having most of its mass concentrated toward the club head and with the second having most of its mass concentrated toward the upper end of the shaft and grip, will balance at different locations along the length of the shaft. In other words, using the swing weight concept, the first club would have a higher swing weight than the second, as the balance point of the first club is farther from the grip end of the club.

Just as the most desirable weight of a club will fall within a maximum and minimum limit, and will vary according to the specific needs of the golfer using that club, so will the swing weight vary over a range between a maximum and a minimum, and will vary according to the golfer using the club in order to suit the "feel" desired by that golfer. A club with too much of the mass concentrated toward the grip will have a relatively low moment of inertia in the swing, and thus will not impart a great deal of driving force to the ball. On the other hand, a club with too much mass in the head will have an extremely high moment of inertia, which will result in a club which is extremely difficult to swing with sufficient velocity for optimum driving distance. Thus, there is an optimum swing weight for every golfer, and moreover, these swing weights should preferably be closely matched in a club set so the golfer need not change his/her swing for different swing weights.

Accordingly, golf club manufacturers have for some time carefully measured and adjusted the swing weights of their golf club sets in order to match the clubs of a set as closely as possible, particularly with higher quality club sets. Heretofore, this has been a relatively tedious and time consuming operation, as when the swing weight is adjusted, each club must first be weighed in order to match the weights as closely as possible. Then the swing weight may be checked by placing the scale fulcrum at the predetermined distance from the end of the grip, with weight then being added or removed from the club head and/or upper shaft/grip as required, while still maintaining the desired total weight of the club. As can be seen, this is a tedious, time consuming process, even for an expert technician.

Moreover, heretofore the scales used have almost universally been unequal length arm mechanical units. Such scales use a relatively small balance weight or counterpoise adjusted along a relatively long arm from the fulcrum, to provide sufficient moment to counterbalance the higher weight of the object being weighed on a relatively short arm. When these scales are made with sufficient sensitivity or accuracy, they will generally have a relatively long counterpoise arm, resulting in a slow period of oscillation and poor damping characteristics. While these characteristics may be reduced in order to reduce the time required for the scale to come to rest during the weighing process, accuracy is also reduced. Thus, the setting of golf club swing weights with the desired accuracy is a very time consuming process.

Accordingly, a need arises for a golf club swing weight scale which is capable of simultaneously measuring both the total weight and the swing weight of a golf club. While the special dual scale configuration of the present scale provides for such simultaneous weight and moment measurement, it will be seen that different types of weight determination means (mechanical, electronic, hydraulic, pneumatic) may be adapted for use with the present scale configuration. The present scale also responds to the above noted problem of damping time by limiting the balance arm motion to an extremely small arc, to reduce the time required for oscillations to dampen out. While the present scale is particularly adapted for the measurement of the total weight and swing weight of a golf club, it will be seen that it may be used for the simultaneous measurement of the weight and moment of innumerable other objects as well, and/or for various golf club or other components. A discussion of the prior art known to the inventor, and its differences from the present invention, follows below.

U.S. Pat. No. 1,897,027 issued to William Gumprich on Feb. 7, 1933 describes a Scale Attachment for measuring the swing weight using a conventional platform scale with dial readout. Obviously, the scale may also be used to measure the total weight of the club, but the swing weight and total weight cannot be determined simultaneously, as only a single scale means is provided, unlike the present scale. Moreover, no particular damping means is disclosed by Gumprich, as provided by the present invention.

U.S. Pat. No. 2,108,877 issued to William L. Wettlaufer on Feb. 22, 1938 describes a Testing Device comprising a first scale having an unequal length arm configuration, and adapted to measure the swing weight of a golf club. The balance arm of the first scale has a secondary scale suspended therefrom, with the fulcrum pivot axis of the second scale disposed at right angles to that of the first scale. The first scale also has a highly restricted range of motion, to reduce the time required for the first scale to come to rest after being disturbed; no such damping reduction means is disclosed for the second scale. A golf club may be installed in the device with the first scale providing an indication of the swing weight or moment along the elongate axis of the club shaft, and the second scale simultaneously providing an indication of the transverse moment through the axially offset club head. No means is provided for simultaneously measuring the total club weight, however, as provided by the present invention.

U.S. Pat. No. 2,595,717 issued to Kenneth Smith on May 6, 1952 describes a Golf Club Scale providing for the determination of both the swing weight and total weight of a golf club. However, Smith provides only a single scale and fulcrum, thus precluding the simultaneous determination of the two values. The club must be placed transversely across the scale cradle in order for the total weight of the club to be measured, and then replaced with the club shaft aligned with the scale balance arm in order to determine the swing weight of the club. Moreover, the Smith scale cannot provide for weighing separate components, as can the present invention.

U.S. Pat. No. 3,577,771 issued to Karsten Solheim on May 4, 1971 describes a Swing Weight And Static weight Balance For Golf Clubs, comprising an elongate stamped metal arm with an upright at each end thereof. A pair of spaced apart, downwardly protruding fulcrums are formed in the arm. A golf club may be placed along the arm, with the grip end captured beneath an overhang on one of the uprights and the club shaft resting on the other, to measure the swing weight. The total weight may also be measured by placing the club transversely across one end of the arm and using the corresponding fulcrum as a balance point. An adjustably placeable counterpoise weight provides for measuring both swing weight and total weight of the subject club. While the device is ingeniously simple and economical, its inherent limitations cannot provide for the simultaneous measuring of both swing weight and total weight of a golf club or other object, as can the present invention.

U.S. Pat. No. 4,043,184 issued to Bernard Sayers on Aug. 23, 1977 describes an Apparatus For Measuring The Swing Weight Of Sporting Implements. Sayers utilizes a pressure sensitive transistor as the weight measurement transducer in his apparatus. The fulcrum of the device includes a laterally disposed notch therein, wherein the club shaft may be placed laterally to measure the total club weight. Swing weight is measured similarly to the procedure used in most of the above described devices, with the end of the grip captured by another component. As in the other devices discussed above, two separate weighing operations must be conducted to measure both the swing weight and total weight of a club.

U.S. Pat. No. 4,212,193 issued to John W. Turley on Jul. 15, 1980 describes an Apparatus And Method For Determining The Moment Of Inertia Of Golf Clubs And Like Objects. Turley refers to the moment of inertia of the clubs as their "dynamic swing weight" (col. 1, l. 63–64), and to the determination of the moment of the clubs from a predetermined reference point as the "static swing weight" (col. 2, l. 24–25). Accordingly, the Turley device operates dynamically by inducing a vibratory oscillation in the club, and then measuring the period of oscillation to calculate the moment of inertia of the club. The present invention is directed to the measurement of static mass, rather than dynamic characteristics. Moreover, Turley fails to provide any means for the measurement of the total weight of the club, let alone providing such means simultaneously with the determination of the swing weight, as provided by the present invention.

U.S. Pat. No. 4,747,314 issued to Ben T. Huang on May 31, 1988 describes a Racket Tester including a scale adapted to measure the total weight of the racket; no swing weight measurement is provided. The balance point of the racket may be found by resting the racket throat on a fulcrum, and checking the position of the end of the handle relative to a fixed distance scale. While the arm measured thusly, along with the total weight, may be used to determine the moment of the racket relative to any given point, Huang does not disclose measuring the swing weight directly.

U. S. Pat. No. 5,222,398 issued to Michael J. O'Brien on Jun. 29, 1993 describes a Thin Film Precision Load Cell, describing load cells manufactured using processes used in microelectronics. The resulting load cells or strain gauges are adaptable for use in the present golf club swing weight scale, but O'Brien does not disclose any enabling means for the construction of a scale providing for the simultaneous measurement of both the total weight and swing weight of a golf club or other article.

British Patent Publication No. 381,729 to Charles W. Bleby and accepted on Oct. 13, 1932 describes An Improved Apparatus For Measuring The Balance Or Leverage Weights Of Tennis Rackets And Other Sporting Implements. The device is a folding scale, having a zero point spaced apart from a fulcrum. The racket is balanced on the fulcrum and the scale is read at the grip end of the handle, to determine whether the racket head is heavy or light. However, Bleby provides no means of weighing the racket; the racket must be weighed using a scale, or must be known in some other way.

British Patent Publication No. 557,192 to Robert Fraser and accepted on Nov. 9, 1943 describes Improvements In Apparatus For Use In Determining The Weight Distribution In Golf Clubs. The device comprises an upper club holder pivotally mounted in a frame, and a lower balance arm mounted in the frame below the club holder. The balance arm is connected to the club holder by means of a pair of tensile wires, as the apparatus is configured so no compressive forces are possible. No means of measuring the total club weight is provided by Fraser, as is provided by the present invention.

Finally, British Patent Publication No. 1,220,804 to the Dunlop Co., Ltd. and published on Jan. 27, 1971 describes an Apparatus For Measuring Or Comparing The Moment Of Inertia Of Golf Clubs, comprising a balance with sliding weights. A scale is provided which empirically indicates the moment of inertia of a golf club. A golf club is secured within the device, and a first weight is positioned along a first scale at a position corresponding to the length of the club. The second weight is then moved to balance the device and club combination, with the moment of inertia of the club then being indicated by the position of the second weight along the second scale. No means of measuring the total weight or swing weight of a golf club is disclosed, let alone any simultaneous determination of those two club characteristics, as provided by the present invention.

None of the above inventions and patents, taken singly or in combination, is seen to describe the instant invention as claimed.

SUMMARY OF THE INVENTION

Accordingly, it is a principal object of the invention to provide an improved golf club swing weight scale including two interconnected scale means, and adapted to determine simultaneously the total weight and swing weight of a golf club or other object.

It is another object of the invention to provide an improved golf club swing weight scale including retention means to secure a complete golf club therein, and a weighing pan adapted for the weighing of separate components.

It is a further object of the invention to provide an improved golf club swing weight scale including means limiting the freedom of motion of the scale, thus reducing the oscillation of the scale and reducing the amount of time required for the scale to establish a rest position during weighing operations.

An additional object of the invention is to provide an improved golf club swing weight scale which scale means may comprise electronic strain gauges or load cells, hydraulic or pneumatic pressure detection means, or mechanical means, as desired.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
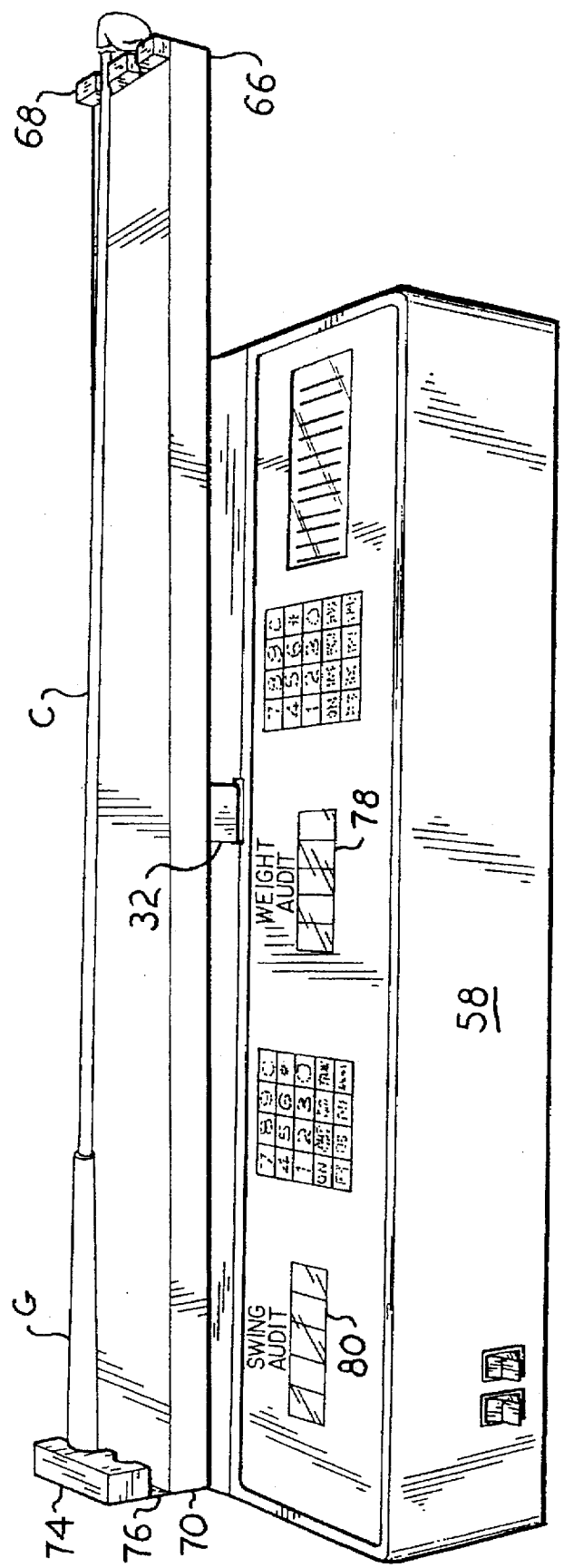
FIG. 1 is a front and top perspective view of the present golf club swing weight scale with a golf club thereon, showing the general features of the scale.
Figure 2:
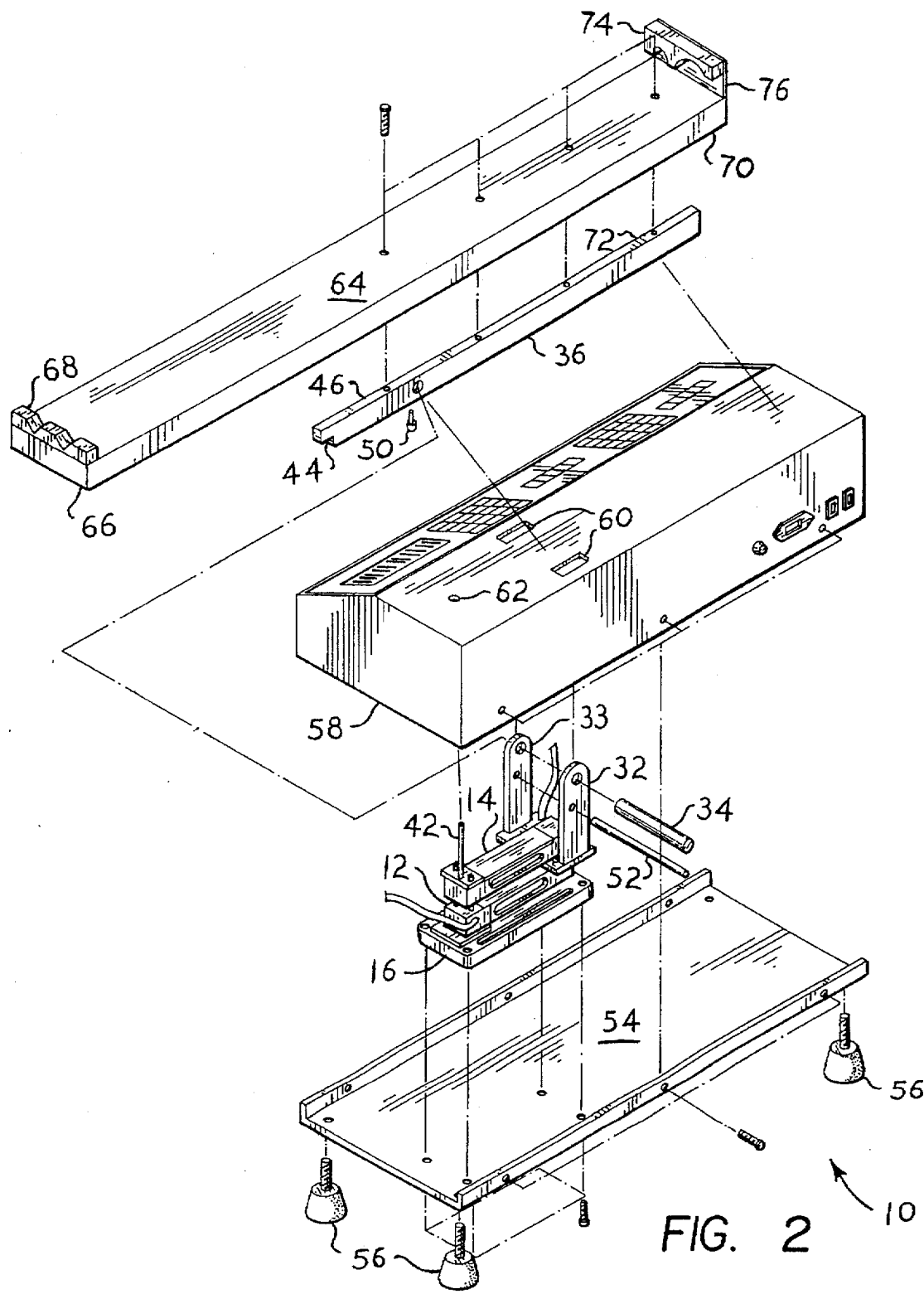
FIG. 2 is an exploded rear perspective view of the present scale, showing its various components.

The present invention relates to a golf club swing weight scale, generally designated with the numeral 10 in FIGS. 1 and 2. The scale 10 is particularly well adapted for use in determining the swing weight of a golf club C, or weight developed at a predetermined distance from the grip end of the club. The present scale 10 enables a user thereof to determine the total weight and swing weight of the club C simultaneously in a single operation, without need to reposition the club C on the scale 10 or to perform any other operation. This is accomplished by means of the unique double weight measuring arrangement of the present scale 10, as shown in detail in FIG. 3 and discussed below.

Figure 3:
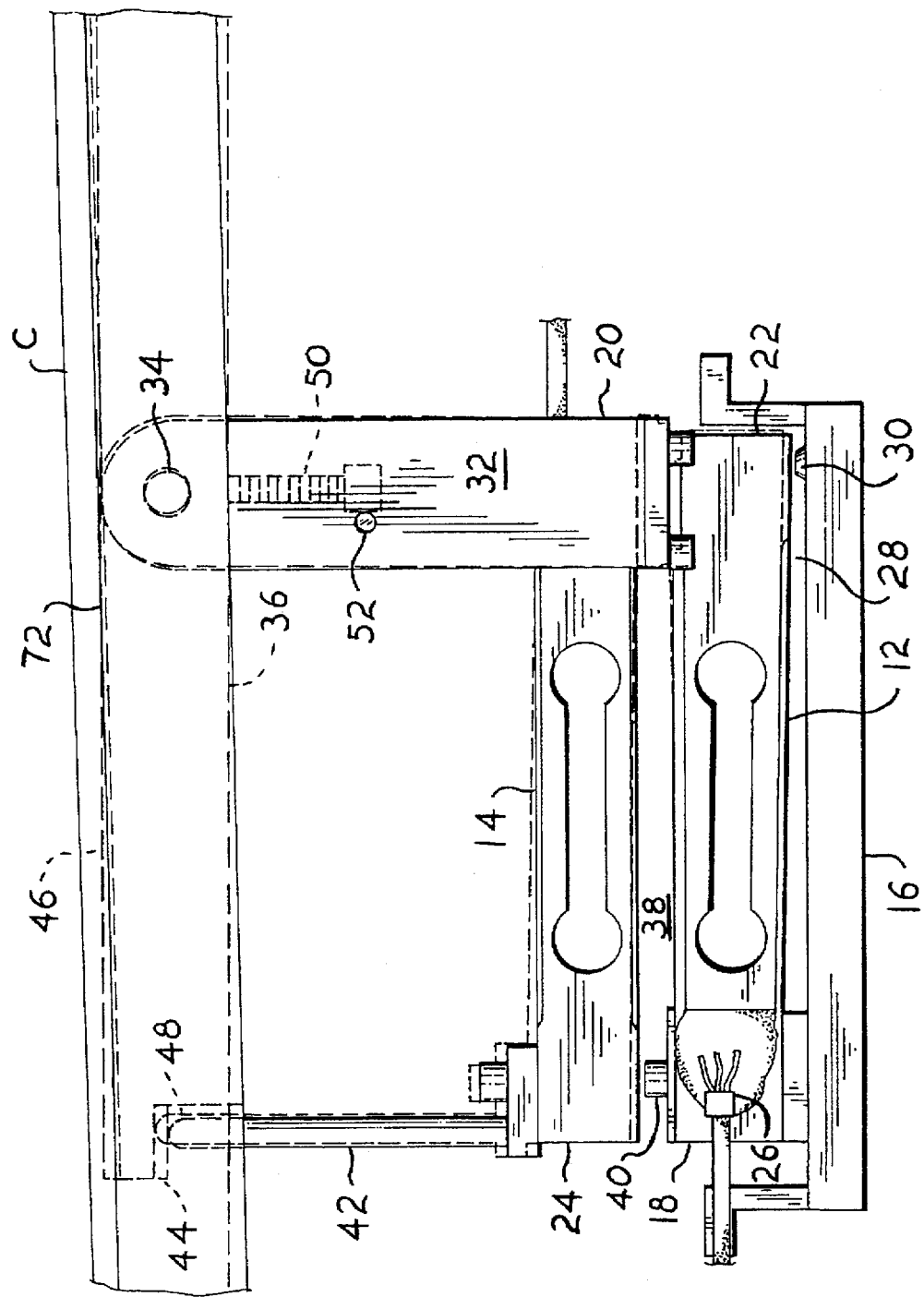
FIG. 3 is a detailed elevation view of the dual weighing means of the present scale, showing their relationship.

FIG. 3 discloses the central concept of the present swing weight scale 10. A first and a second weight measuring device, respectively designated as 12 and 14, are mounted above a solid, rigid base plate 16. The weight measuring devices 12 and 14 of FIGS. 2 and 3 are conventional electronic strain gauges or load cells, capable of determining the weight of an object by means of changes in the electrical properties of the cells as they are bent slightly or deflected by the weight of the object. Other weighing means may be substituted, as will be shown further below.

Each of the load cells 12 and 14 comprises an elongate beam with a first end, respectively 18 and 20, and an opposite second end, respectively 22 and 24. Each of the first ends 18 and 20 includes an electronic strain gauge weight measurement device secured thereto. (As the two load cells 12 and 24 are positionally reversed from one another in the drawing figures, it will be seen that only the first strain gauge device, designated with the numeral 26, is visible in the drawings. However, the two load cells 12 and 24 are identical, so it will be understood that the second load cell 24 also includes a strain gauge device identical to the first strain gauge device 26 of the first load cell 22.)

The first load cell first end 18 is affixed to the base plate 16, with a gap 28 between the load cell 12 and the underlying plate 16. (A closely spaced stop 30 may be provided to allow a slight deflection of the load cell 12, but precluding excessive bending of the cell 12.) Thus, the second end 22 of the first cell 12 is free to move between an unladen undeflected position, shown in broken lines, and a deflected position when weight is placed thereon, shown by the solid line representation of the cell 12.

The free second end 22 of the first cell 12 includes a balance fulcrum affixed thereto and extending upwardly therefrom comprising a first balance arm support 32 and an opposite spaced apart second balance arm support 33 (shown in the perspective view of FIG. 2). An axle 34 providing pivotal support for an unequal length balance beam 36 extends between the two supports, with the balance beam 36 and first and second load cells 12 and 14 being mutually coplanar.

Also attached to the uppermost portion of the free end 22 of the first cell 12, is a second load cell 14. The first end 20 of the second cell 14 is affixed to the free second end 22 of the first cell 12 by means of bolts or other suitable means providing a rigid and immovable attachment; such load cells 12 and 14 are typically provided with fastener holes in both their first and second ends. As in the case of the first cell 12 and the underlying mounting plate 16, the second cell 14 is cantilevered over the first cell 12, with a gap or space 38 therebetween. A stop or stops 40 may be provided between the fixed first end 18 of the first cell 12 and the free second end 24 of the second cell 14, which stop(s) 40 may also serve as the head(s) of the attachment bolt(s).

A load rod 42 extends upwardly from the free second end 24 of the second load cell beam 14, with the distal end 44 of the relatively shorter first arm 46 of the balance beam 36 bearing downwardly on the uppermost end 48 of the load rod 42 when weight is removably placed upon the scale 10. The length of the load rod 42 is adapted to just contact the distal end 44 of the balance beam 36 when the scale 10 is unladen and the balance beam 36 is level.

While the balance beam 36 is precluded from excessive motion toward the load rod 42 in the above described manner, stop means must be provided to preclude excessive motion in the opposite direction. Accordingly, a strut 50 extends downwardly from the balance beam 36 below the axle 34, with a strut stop pin 52 extending between the two supports 32 and 33.

The strut stop pin 52 will be seen to be offset from the vertical centerline of the balance beam supports 32 and 33, which is coplanar with the balance beam axle 34. The offset is toward the second load cell 14 and load rod 42 extending upwardly therefrom, and is just sufficient so the end of the strut 50 just contacts the strut stop pin 52 when the scale 10 is unladen and the balance beam 36 is level. Thus, the balance beam 36 is always held in an essentially level attitude once the scale 10 has been leveled for use, and is precluded from any significant oscillation in either direction, thus significantly reducing the amount of time required for the mechanism to establish a rest position after a weight is placed thereon. It will be seen that the required amount of motion for the balance beam 36 is negligible, as the actual movement of the two load cell beams 12 and 14 as they are deflected when weight is placed on the scale 10, is also negligible.

The above described arrangement will be seen to transmit the total downward force of any weight(s) positioned at any point(s) along the balance beam 36, through the first load cell beam 12 and strain gauge 26, as both the balance fulcrum and the second load cell beam 14 are mounted atop the free end 22 of the first load cell beam 12. However, the free end 24 of the second load cell 14 receives downward force only through the load rod 42, which is spaced apart from the balance fulcrum. Thus, the second load cell 14 is measuring only a part of the weight applied to the balance beam 36, which is multiplied by the distance from a predetermined datum point to provide a moment for the article being weighed.

It will be seen that the above total weight measurement and partial weight measurement at some distance from a predetermined datum point, may be conducted simultaneously, with the second load cell beam 14 receiving a downward load only from the load rod 42, while the first load cell beam 12 receives the total downward load from both the second load cell beam 14 affixed thereto at the fulcrum point, and also from the balance fulcrum. Thus, the total weight, as well as the moment from a predetermined point (or swing weight) of a golf club, or any other suitable object as desired, may be measured simultaneously using the present scale 10, with no need to remove or reposition the article, reset the scale, or to perform any other operation after the initial placement of the golf club or other article upon the scale 10.

The above described weighing means assembly, comprising components 12 through 52, is assembled in a golf club swing weight scale assembly 10, as shown in FIG. 2. The base plate 16 of the weighing assembly is secured to a scale case floor 54, which includes a plurality of vertically adjustable footpads 56 extending downwardly therefrom. The footpads 56 enable the floor 54, and thus the scale mechanism, to be leveled accurately. With the balance beam 36, beam axle 34, and strut stop 52 removed from the weighing assembly of FIG. 3, an upper case cover 58 is placed over the assembly and scale case floor 54, with slots 60 and a load rod passage 62 providing clearance respectively for the balance arm supports 32 and 33 and the load rod 42. The balance beam 36, axle 34, and strut stop 52 are then reinstalled on the weighing assembly.

It will be seen that some means must be provided to hold and secure an article to be weighed, to the balance beam 36. Accordingly, a flat, planar, and elongate weighing pan 64 is secured to the top of the balance beam 36, with the weighing pan 64 being adapted to support various articles (disassembled golf club components, etc.) thereon for weighing as desired. The first end 66 of the pan 64 includes a golf club shaft support 68 disposed laterally thereacross, with the shaft support 68 being adapted to support the shaft of a golf club C therein, generally as shown in FIG. 1 of the drawings. (it will be understood that the shaft shown in FIG. 1 is broken to show an indefinite length and to conserve space in the drawing figure, and that an actual club head would be farther out from the pan 64 than indicated in FIG. 1.)

The opposite second end 70 of the pan 64, corresponding to the longer second arm 72 of the balance beam 36, includes a retainer 74 thereon, adapted to secure the distal end of a club grip G, or the end of the shaft with the grip G removed, thereunder. (Preferably, two retaining slots are provided in the retainer 74, with one sufficiently large to hold a club grip G, and the other having a smaller size adapted to fit the distal end of a club shaft with the grip removed.) The club grip end retainer 74 includes a wall 76 serving as a stop for the accurate longitudinal positioning of a golf club C on the weighing pan 64. This stop 76 is preferably located precisely fourteen inches from the center of the load rod 42, thus causing the second load cell 14 to measure the partial weight of the club C distributed fourteen inches from the grip end.

The above noted fourteen inch arm or distance between the grip end stop 76 and the load rod 42 is preferred, as most of the different swing weight measurement systems are based upon a fourteen inch moment arm measured from the upper or distal end of the golf club grip. It will be seen that placing the load rod 42 precisely fourteen inches from the upper end of the club grip G, allows the partial weight of the club C as distributed at that fourteen inch datum point, to be read directly using the second weight scale means corresponding to the second load cell 14. However, using the electronic weighing means provided by the load cells 12 and 14 of the present scale 10, it will be seen that other dimensions may be used, and compensated for electronically. Also, the so-called "official" swing weight scale uses an arm of twelve inches, rather than fourteen, and the present scale 10 may be constructed to such a moment arm dimension, if desired.

The upper case cover 58 may include the electronic means to convert the electrical signals from the load cells 12 and 14 to an appropriate form corresponding to the weights placed thereon, and further means to provide a digital readout based upon those electrical signals, as shown most clearly in FIG. 1. The first load cell 12, measuring the total weight placed upon the scale 10, corresponds to a weight audit readout 78, while the second cell 14, measuring the partial weight at the fourteen inch datum point, corresponds to the swing audit readout 80. Other control means, keyboards, and electronics may also be incorporated as required, but are beyond the scope of the present scale 10 configuration.

Figure 4:
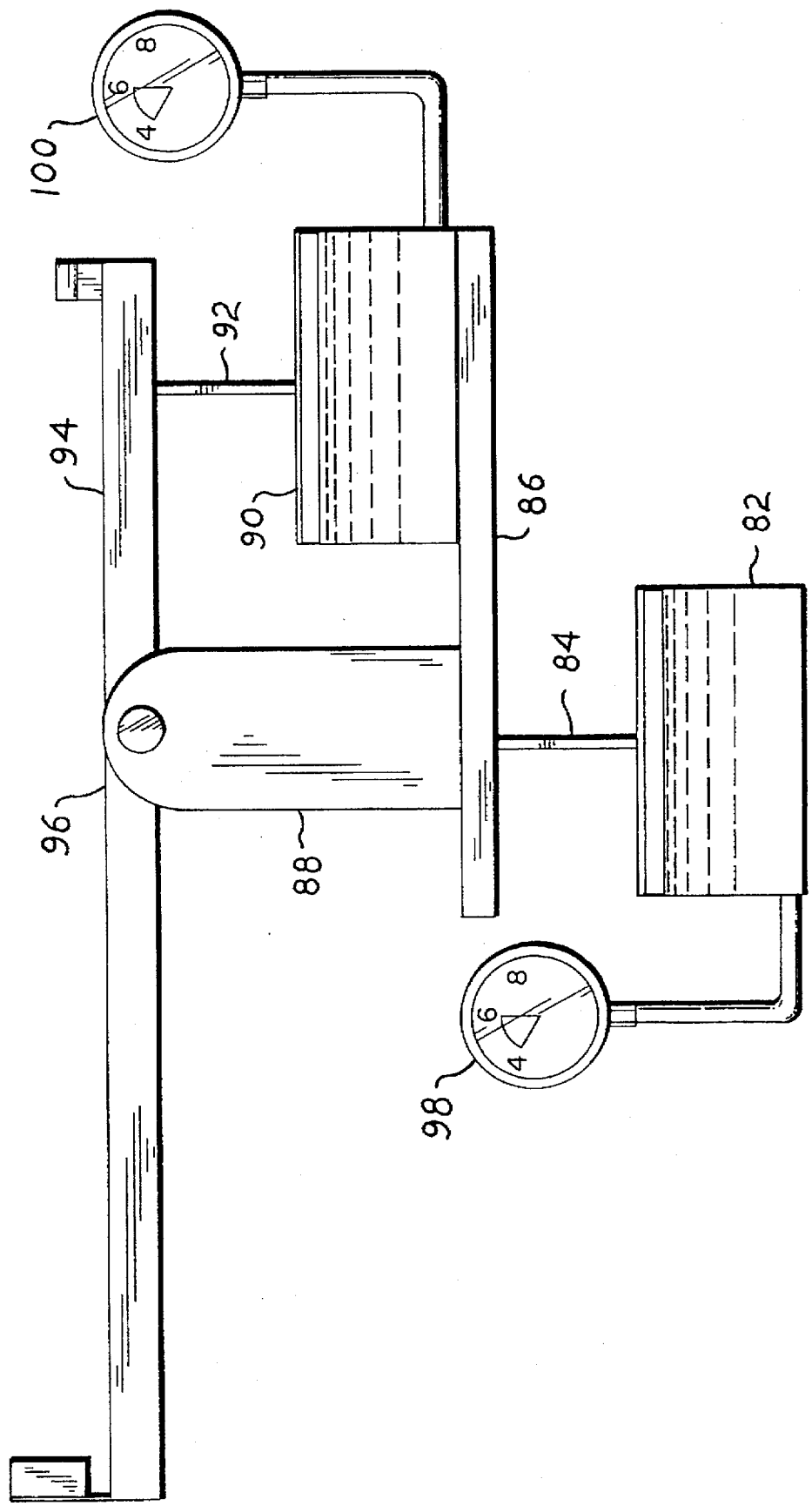
FIG. 4 is a schematic elevation view of an alternate scale embodiment, using fluid means for weight detection.

The present golf club swing weight scale 10 invention is primarily directed to a specific double scale configuration enabling both the total weight and the swing weight of a golf club to be measured simultaneously, without undue delay due to scale oscillation. It will be seen that the above described electronic means of carrying out the present invention is but one means, and that other weight measurement means may be incorporated. Another example of such is shown in FIG. 4, wherein a fluid weight measurement means is disclosed. While the fluid weight measurement means of FIG. 4 is shown generally and schematically, it will be understood that additional components (base, enclosure, attachment and support hardware, etc.) may be provided conventionally.

Also, it will be understood that the term "fluid" encompasses both essentially incompressible liquids and compressible gases. While the present invention in its fluid embodiment could operate using compressible pneumatic gas means, the compression of such gases would allow more movement in the balance mechanism than might be desirable, thereby introducing undesirable oscillation in such a scale. However, the use of a substantially incompressible liquid in a hydraulic embodiment, will be seen to function similarly to the electronic embodiment discussed further above, in which practically no motion or play is introduced into the scale balance when weight is placed thereon, thereby allowing the provision of stop means to preclude oscillation of the scale and thereby to reduce or eliminate the time required for the scale to reach equilibrium.

In FIG. 4, a first fluid chamber 82 has a first load rod 84 extending upwardly therefrom to support an extension and second fluid chamber support 86. The extension and chamber support 86 has a balance fulcrum 88 thereon, and preferably disposed essentially directly over the first fluid chamber 82, so as to preclude asymmetric lateral loads on the load rod 84 and chamber 82. The extension 86 also supports a second fluid chamber 90, offset from the balance fulcrum 88, with a second load rod 92 extending upwardly from the second fluid chamber 90 to contact the relatively short first arm 94 of the balance beam 96.

Operation of the fluid scale configuration shown in FIG. 4 is somewhat similar to the operation of the electronic scale 10 discussed further above. As the entire extension and second chamber support 86, including the second chamber 90, fulcrum 88, and balance beam 96, is supported by the first chamber load rod 84, it will be seen that all weight placed upon the balance beam 96, no matter what its location along the beam, will be transferred to the first fluid chamber 82 to create a pressure therein. This pressure may be read by means of a first pressure gauge 98, which may be calibrated to indicate the weight placed upon the first chamber 82, if desired. The second chamber 90 will only be affected by weight distributed along the shorter first arm 94 of the balance beam, in the manner of the second load cell 14 of the first embodiment. Thus, any partial unbalanced weight distributed toward the balance beam first arm 94 will induce a pressure in the second chamber 90, which may be read on a second gauge 100.

In summary, the above described golf club swing weight scale 10, and its other non-electronic embodiments, will be seen to provide a highly accurate means of checking the total weight and swing weight relative to a predetermined datum point, of a golf club. A set of clubs may be quickly and easily checked using the present swing weight scale, with total weight being adjusted as desired between clubs to provide the mass desired for each club.

Moreover, the swing weight may be determined simultaneously, thereby enabling the technician to add or subtract weight as desired from the club head or grip area to provide the optimum swing weight for each club. Not only is the total number of weighing operations cut in half using the present swing weight scale, but the lack of movement provided by the electronic load cell and hydraulic fluid chamber embodiments of the present swing weight scale, substantially reduce or eliminate scale balance beam oscillations and time required for the scale to reach equilibrium. The scale pan provided is also useful for weighing separate golf club components, as well as for positioning an assembled club precisely relative to the weight measurement means in order to measure the swing weight accurately. Accordingly, a technician using the present swing weight scale will see his/her productivity increase substantially, resulting in more economical and precise adjustment of swing weight and club matching for golfers.

It is to be understood that the present invention is not limited to the sole embodiments described above, but encompasses any and all embodiments within the scope of the following claims.

I claim:

1. A golf club swing weight scale, including:
a first weight measurement means having a scale balance fulcrum extending upwardly therefrom and adapted to measure the total weight of an article removably placed upon said scale, and a second weight measurement means disposed atop said first weight measurement means and offset from said balance fulcrum and adapted to measure any partial article weight offset from said balance fulcrum simultaneously with the total weight of the article being measured by said first weight measurement means, and;
said balance fulcrum comprising spaced apart first and second balance arm supports with an unequal length arm balance beam pivotally mounted therebetween on an axle extending between said first and second supports, with said first scale means, said second scale means, and said balance beam being in coplanar alignment.

2. The golf club swing weight scale according to claim 1, wherein:
said first and said second weight measurement means each comprise electronic weight measurement devices.

3. The golf club swing weight scale according to claim 2, wherein:
said first and said second weight measurement means each comprise an elongate load cell bending beam having a first end and an opposite second end;
said first end of said first load cell beam being secured to a base plate and having first electronic strain gauge weight measurement means secured thereto, and said second end of said first load cell beam being spaced apart from said base plate and having said balance fulcrum extending upwardly therefrom;
said first end of said second load cell beam being overlyingly secured to said second end of said first load cell beam and having second electronic strain gauge weight measurement means secured thereto, and said second end of said second load cell beam being spaced apart from said first end of said first load cell beam and having a load rod extending upwardly therefrom;
said balance beam having a short first arm overlying said second load cell beam, with said balance beam first arm having a distal end directly overlying said load rod, with said load rod adapted to transfer any partial weight of an article placed upon said scale and offset from said balance fulcrum toward said end of said first arm of said balance beam to said second end of said second load cell beam, thereby providing an indication of any partial weight of the article by said second load cell beam.

4. The golf club swing weight scale of claim 1, wherein:
said first and said second weight measurement means each comprise fluid weight measurement devices selected from the group consisting of hydraulic devices and pneumatic devices.

5. The golf club swing weight scale of claim 4, wherein:
said first and said second fluid weight measurement devices each comprise a fluid chamber having fluid pressure readout means, with said first fluid chamber having a first load rod extending upwardly therefrom supporting a balance fulcrum directly thereabove and further supporting an offset second fluid chamber support having a second fluid chamber thereon, with said second fluid chamber having a second load rod extending upwardly therefrom;
said balance beam having a short first arm overlying said second fluid chamber, with said balance beam first arm having a distal end directly overlying said second load rod, with said second load rod adapted to transfer any partial weight of an article placed upon said scale and offset from said balance fulcrum toward said end of said first arm of said balance beam to said second fluid chamber, thereby providing an indication of any partial weight of the article by said second fluid chamber fluid pressure readout means, and with the total weight of the article being transferred to said first fluid chamber by means of said first load rod disposed beneath said balance fulcrum to provide an indication of the total weight by said first fluid chamber fluid pressure readout means.

6. The golf club swing weight scale according to claim 1, including:
balance beam oscillation limitation means.

7. The golf club swing weight scale according to claim 6, wherein:

said balance beam oscillation limitation means comprises a strut depending from said balance beam between said balance arm supports of said balance fulcrum, and a strut stop extending between said balance arm supports and offset below said axle toward said second weight measurement means and with said strut being immediately adjacent said strut stop;

said second weight measurement means including a load rod extending upwardly therefrom, said balance beam having a short first arm overlying said second weight measurement means, with said balance beam first arm having a distal end directly overlying said load rod, so that said balance beam is precluded from significant pivotal movement in a first direction away from said second weight measurement means by said strut contacting said strut stop, and further precluded from significant pivotal movement in a second direction toward said weight measurement means by said distal end of said first arm of said balance beam contacting said load rod.

8. The golf club swing weight scale according to claim 1, including:

a weighing pan disposed atop said balance beam, with said weighing pan having a first end adapted to support a golf club shaft thereon and an opposite second end adapted to secure the upper end of a golf club therein to determine the total weight and partial weight of the golf club offset from said balance fulcrum of said scale, and a flat, planar surface therebetween adapted to support various components thereon for weighing.

9. A golf club swing weight scale, including:

a first weight measurement means having a scale balance fulcrum extending upwardly therefrom and adapted to measure the total weight of an article removably placed upon said scale, and a second weight measurement means disposed atop said first weight measurement means and offset from said balance fulcrum and adapted to measure any partial article weight offset from said balance fulcrum simultaneously with the total weight of the article being measured by said first weight measurement means;

said balance fulcrum comprising spaced apart first and second balance arm supports with an unequal length arm balance beam pivotally mounted therebetween on an axle extending between said first and second supports, with said first scale means, said second scale means, and said balance beam being in coplanar alignment, and;

balance beam oscillation limitation means comprising a strut depending from said balance beam between said balance arm supports of said balance fulcrum, and a strut stop extending between said balance arm supports and offset below said axle toward said second weight measurement means and with said strut being immediately adjacent said strut stop;

said second weight measurement means including a load rod extending upwardly therefrom, said balance beam having a short first arm overlying said second weight measurement means, with said balance beam first arm having a distal end directly overlying said load rod, so that said balance beam is precluded from significant pivotal movement in a first direction away from said second weight measurement means by said strut contacting said strut stop, and further precluded from significant pivotal movement in a second direction toward said weight measurement means by said distal end of said first arm of said balance beam contacting said load rod.

10. The golf club swing weight scale according to claim 9, wherein:

said first and said second weight measurement means each comprise electronic weight measurement devices.

11. The golf club swing weight scale according to claim 10, wherein:

said first and said second weight measurement means each comprise an elongate load cell bending beam having a first end and an opposite second end;

said first end of said first load cell beam being secured to a base plate and having first electronic strain gauge weight measurement means secured thereto, and said second end of said first load cell beam being spaced apart from said base plate and having said balance fulcrum extending upwardly therefrom;

said first end of said second load cell beam being overlyingly secured to said second end of said first load cell beam and having second electronic strain gauge weight measurement means secured thereto, and said second end of said second load cell beam being spaced apart from said first end of said first load cell beam and having a load rod extending upwardly therefrom;

said balance beam having a short first arm overlying said second load cell beam, with said balance beam first arm having a distal end directly overlying said load rod, with said load rod adapted to transfer any partial weight of an article placed upon said scale and offset from said balance fulcrum toward said end of said first arm of said balance beam to said second end of said second load cell beam, thereby providing an indication of any partial weight of the article by said second load cell beam.

12. The golf club swing weight scale of claim 9, wherein:

said first and said second weight measurement means each comprise fluid weight measurement devices selected from the group consisting of hydraulic devices and pneumatic devices.

13. The golf club swing weight scale of claim 12, wherein:

said first and said second fluid weight measurement devices each comprise a fluid chamber having fluid pressure readout means, with said first fluid chamber having a first load rod extending upwardly therefrom supporting a balance fulcrum directly thereabove and further supporting an offset second fluid chamber support having a second fluid chamber thereon, with said second fluid chamber having a second load rod extending upwardly therefrom;

said balance beam having a short first arm overlying said second fluid chamber, with said balance beam first arm having a distal end directly overlying said second load rod, with said second load rod adapted to transfer any partial weight of an article placed upon said scale and offset from said balance fulcrum toward said end of said first arm of said balance beam to said second fluid chamber, thereby providing an indication of any partial weight of the article by said second fluid chamber fluid pressure readout means, and with the total weight of the article being transferred to said first fluid chamber by means of said first load rod disposed beneath said balance fulcrum to provide an indication of the total weight by said first fluid chamber fluid pressure readout means.

14. The golf club swing weight scale according to claim 9, including:

a weighing pan disposed atop said balance beam, with said weighing pan having a first end adapted to support a golf club shaft thereon and an opposite second end adapted to secure the upper end of a golf club therein to determine the total weight and partial weight of the golf club offset from said balance fulcrum of said scale, and a flat, planar surface therebetween adapted to support various components thereon for weighing.

15. A golf club swing weight scale, including:

a first weight measurement means having a scale balance fulcrum extending upwardly therefrom and adapted to measure the total weight of an article removably placed upon said scale, and a second weight measurement means disposed atop said first weight measurement means and offset from said balance fulcrum and adapted to measure any partial article weight offset from said balance fulcrum simultaneously with the total weight of the article being measured by said first weight measurement means;

said balance fulcrum comprising spaced apart first and second balance arm supports with an unequal length arm balance beam pivotally mounted therebetween on an axle extending between said first and second supports, with said first scale means, said second scale means, and said balance beam being in coplanar alignment, and;

a weighing pan disposed atop said balance beam, with said weighing pan having a first end adapted to support a golf club shaft thereon and an opposite second end adapted to secure the upper end of a golf club therein to determine the total weight and partial weight of the golf club offset from said balance fulcrum of said scale, and a flat, planar surface therebetween adapted to support various components thereon for weighing.

16. The golf club swing weight scale of claim 15, wherein:

said first and said second weight measurement means each comprise electronic weight measurement devices.

17. The golf club swing weight scale according to claim 16, wherein:

said first and said second weight measurement means each comprise an elongate load cell bending beam having a first end and an opposite second end;

said first end of said first load cell beam being secured to a base plate and having first electronic strain gauge weight measurement means secured thereto, and said second end of said first load cell beam being spaced apart from said base plate and having said balance fulcrum extending upwardly therefrom;

said first end of said second load cell beam being overlyingly secured to said second end of said first load cell beam and having second electronic strain gauge weight measurement means secured thereto, and said second end of said second load cell beam being spaced apart from said first end of said first load cell beam and having a load rod extending upwardly therefrom;

said balance beam having a short first arm overlying said second load cell beam, with said balance beam first arm having a distal end directly overlying said load rod, with said load rod adapted to transfer any partial weight of an article placed upon said scale and offset from said balance fulcrum toward said end of said first arm of said balance beam to said second end of said second load cell beam, thereby providing an indication of any partial weight of the article by said second load cell beam.

18. The golf club swing weight scale of claim 15, wherein:

said first and said second weight measurement means each comprise fluid weight measurement devices selected from the group consisting of hydraulic devices and pneumatic devices.

19. The golf club swing weight scale of claim 18, wherein:

said first and said second fluid weight measurement devices each comprise a fluid chamber having fluid pressure readout means, with said first fluid chamber having a first load rod extending upwardly therefrom supporting a balance fulcrum directly thereabove and further supporting an offset second fluid chamber support having a second fluid chamber thereon, with said second fluid chamber having a second load rod extending upwardly therefrom;

said balance beam having a short first arm overlying said second fluid chamber, with said balance beam first arm having a distal end directly overlying said second load rod, with said second load rod adapted to transfer any partial weight of an article placed upon said scale and offset from said balance fulcrum toward said end of said first arm of said balance beam to said second fluid chamber, thereby providing an indication of any partial weight of the article by said second fluid chamber fluid pressure readout means, and with the total weight of the article being transferred to said first fluid chamber by means of said first load rod disposed beneath said balance fulcrum to provide an indication of the total weight by said first fluid chamber fluid pressure readout means.

20. The golf club swing weight scale according to claim 15, including:

balance beam oscillation limitation means comprising a strut depending from said balance beam between said balance arm supports of said balance fulcrum, and a strut stop extending between said balance arm supports and offset below said axle toward said second weight measurement means and with said strut being immediately adjacent said strut stop;

said second weight measurement means including a load rod extending upwardly therefrom, said balance beam having a short first arm overlying said second weight measurement means, with said balance beam first arm having a distal end directly overlying said load rod, so that said balance beam is precluded from significant pivotal movement in a first direction away from said second weight measurement means by said strut contacting said strut stop, and further precluded from significant pivotal movement in a second direction toward said weight measurement means by said distal end of said first arm of said balance beam contacting said load rod.

* * * * *